US008142110B2

(12) United States Patent
Abe et al.

(10) Patent No.: US 8,142,110 B2
(45) Date of Patent: Mar. 27, 2012

(54) ANCHOR FIXING AGENT, ANCHOR FIXING AGENT AMPULE, AND METHOD FOR FIXING ANCHOR

(75) Inventors: Keiichi Abe, Tokyo (JP); Junichiro Abe, Tokyo (JP); Tomoyasu Taguchi, Tokyo (JP); Sunao Ookubo, Tokyo (JP); Isao Shinoda, Tokyo (JP); Takashi Nagoshi, Tokyo (JP)

(73) Assignee: Adeka Corporation, Tokyo (JP)

( * ) Notice: Subject to any disclaimer, the term of this patent is extended or adjusted under 35 U.S.C. 154(b) by 775 days.

(21) Appl. No.: 11/813,890

(22) PCT Filed: Jan. 13, 2006

(86) PCT No.: PCT/JP2006/300351
§ 371 (c)(1),
(2), (4) Date: Oct. 18, 2007

(87) PCT Pub. No.: WO2006/075688
PCT Pub. Date: Jul. 20, 2006

(65) Prior Publication Data
US 2010/0150666 A1    Jun. 17, 2010

(30) Foreign Application Priority Data

Jan. 14, 2005   (JP) ................................ 2005-008305

(51) Int. Cl.
*E21D 20/00*  (2006.01)
*E02D 5/80*   (2006.01)
(52) U.S. Cl. .................................... 405/259.6; 106/800
(58) Field of Classification Search ............... 405/259.7; 106/800
See application file for complete search history.

(56) References Cited

U.S. PATENT DOCUMENTS

| 4,113,834 | A  | * | 9/1978 | Show et al. ................... 423/155 |
| 4,395,162 | A  | * | 7/1983 | Murphy et al. ............ 405/259.6 |
| 4,797,159 | A  | * | 1/1989 | Spangle ........................ 106/694 |
| 5,669,968 | A  | * | 9/1997 | Kobori et al. ................ 106/696 |
| 7,070,647 | B2 | * | 7/2006 | Fujimori et al. .............. 106/691 |
| 2005/0103235 | A1 | * | 5/2005 | Harrison ....................... 106/801 |

FOREIGN PATENT DOCUMENTS

| EP | 0081385 |   | 6/1983 |
| GB | 1293619 A | * | 10/1972 |
| GB | 1293620 |   | 10/1972 |
| GB | 1599918 |   | 10/1981 |
| GB | 2188922 |   | 10/1987 |
| JP | 61-191552 A |   | 8/1986 |
| JP | 63-89440 A |   | 4/1988 |
| JP | 4-76200 A |   | 3/1992 |
| JP | 2000-128619 A |   | 5/2000 |
| JP | 2001-97759 A |   | 4/2001 |

* cited by examiner

*Primary Examiner* — John Kreck
(74) *Attorney, Agent, or Firm* — Sughrue Mion, PLLC

(57) ABSTRACT

Provided are an anchor fixing agent which can fill up fine concave and convex portions present on the inner surface of a hole formed in a base material and can maintain great strength, in particular, even after the lapse of a long period of time; an anchor fixing agent ampule; and a method for fixing an anchor. An anchor fixing agent which comprises an alumina cement, a lime and/or a portland cement, and water. Preferably, it further comprises an agent for the retardation of setting and light magnesia. The anchor fixing agent ampule holds a solid component and a liquid component in the anchor fixing agent in the state wherein the components are separated from each other.

9 Claims, No Drawings

ANCHOR FIXING AGENT, ANCHOR FIXING AGENT AMPULE, AND METHOD FOR FIXING ANCHOR

FIELD OF THE INVENTION

The present invention relates to an anchor fixing agent, an anchor fixing agent ampule, and a method for fixing anchor to a mother material, particularly for fixing anchors such as bolt (e.g. whole screw bolt) and deformed bar to mother materials including concrete and rocks.

BACKGROUND OF THE INVENTION

Anchoring using anchor fixing agents in boreholes which are formed in natural rocks, bedrocks and concrete and the like as mother materials has been conventionally practiced. For example, in Patent Reference 1, fixing anchor using cements including portland cement, aluminate cement, alumina-fused cement, and water glass as a curing agent, as anchor fixing agents is proposed, and actually practiced by using portland cement.

However these cement compositions which has high viscosity can not fill the mother material surface, exactly minute unevenness on the inner surface of boreholes formed on the mother material, and therefore it is difficult to maintain high strength, particularly longitudinal high strength.

Although low concentration can lower the viscosity and fill the minute unevenness on the mother material surface, there is still a problem of strength shortage in the cement it self.
Patent reference 1: Japanese Unexamined Patent Application Publication No. 2000-128619

DISCLOSURE OF THE INVENTION

Problem to be Solved by the Invention

It is an object of the present invention to provide an anchor fixing agent, an anchor fixing agent ampule, and a method for fixing anchor which can fill minute unevenness on the inner surface of boreholes formed on the mother material and maintain high strength, particularly longitudinal high strength.

Means for Solving Problem

The inventors accomplished the present invention as a result of study in view of the above object. That means, the present invention features that the anchor fixing agent contains, as essential component, alumina cement, limes and/or portland cement, and water, and preferably setting retardant and light burned magnesia. Further the anchoring adhesive ampule of the present invention features that a solid component and a liquid component of the anchor fixing agent are separately sealed. Further, a method for fixing anchor to the mother material features fixing the anchor to the mother material using the anchor fixing agent or anchor fixing agent ampule.

Effect of the Invention

Effect of the present invention is to provide an anchor fixing agent, an anchor fixing agent ampule and a method for fixing anchor, which are capable of filling minute unevenness on the inner surface of the borehole formed in the mother material and maintaining high strength, especially longitudinally high strength.

THE BEST MODE FOR CARRYING OUT THE CLAIMED INVENTION

First, an anchor fixing agent will be described. Alumina cement used for the anchor fixing agent of the present invention is not particularly limited but any alumina cement available for structure and construction materials may be used. Commercial alumina cement is also available. A single type or a mixture of two types or more may be available.

As for limes used for the anchor fixing agent of the present invention, limes which have reactivity with alumina cement in the presence of water may be available. They are not particularly limited, but for example hydrated lime, dolomite plaster and the like and mixtures thereof may be cited (calcium carbonate having no reactivity with alumina cement in the presence of water is not included), and hydrate lime is preferable in view of setting property, costs and others.

Portland cements used for the anchor fixing agent of the present invention may not be particularly limited but any portland cements may be used. Cited may be, for example, normal portland cement, high early strength Portland cement, ultra high early strength Portland cement, moderate heat Portland cement, low heat Portland cement, sulfate-resisting portland cement or mixtures thereof and commercial Portland cement may be used.

In the anchor fixing agent of the present invention, preferable use rate of alumina cement to limes and/or portland cement is alumina cement:[limes and/or Portland cement] =100:0.1 to 100:100, more preferably 100:10 to 100:50 in terms of mass ratio. With regard to limes and/or Portland cement, total mass of both including the case that use amount of either one is 0 is taken into consideration. When the ratio of the alumina cement is extremely less than the above mentioned ratio, the strength tends to develop late. When the ratio is too much contrarily, final strength tends to decrease.

The anchor fixing agent further contains water. When water ratio is too low, the anchor fixing agent becomes uneven, while when the water ratio too high, component is diluted. Therefore in each case, the strength tends to be poor.

Therefore, water amount is not necessarily limited but solid content of the anchor fixing agent of the present invention is selected to set at preferably a range of 50 to 99 mass, more preferably 60 to 95 mass, further more preferably 70 to 90 mass %. When material containing water such as crystal water is used for the above mentioned water content, the water therein is inclusive. And when the later described optional components are used, solid component as entire anchor fixing agent including those is considered.

If the anchor fixing agent of the present invention is water-mixed after mixing alumina cement, hydrated limes and/or portland cement as essential component, hard setting reaction is shown.

If several seconds or several minutes is desired to secure for setting time though it depends on using mode, setting retardant may be used.

Setting retardant are not limited as long as they have function to seal off (coordinate) calcium ion. As for the organic setting retardant, cited may be, for example, simple sugar, oxycarboxylic acid (e.g. gluconic acid) or salt thereof (e.g. sodium salt), protein, and mixtures thereof. Further as for inorganic setting retardant, cited may be metal oxides such as copper oxide and zinc oxide, hydrosulfate, phosphate, borate, and mixtures thereof.

With regard to retardants cited here for the anchor fixing agent ampule of the present invention in which solid component and liquid component are separately sealed off, there are a method for mixing them in the solid component and a way of dissolving them in the liquid component previously. Either way or both ways may be employed.

Used amount of the setting retardant is not limited as long as the amount allows the target setting time when the anchor fixing agent of the present invention is mixed up with water. Preferable is a range of 0.01 parts by mass to 10 parts by mass to total amount of 100 parts by mass alumina cement and limes and/or portland cement, and more preferable is 0.05 parts by mass to 2 parts by mass.

In the consolidated material of the anchor fixing agent of the present invention, wherein alumina cement as essential component and limes and/or portland cement are mixed, water-mixed and cured, decrease in uniaxial compressive strength has been shown since about two weeks after curing in some cases.

For the anchor fixing agent of the present invention, it is preferable to contain light burned magnesia in order to maintain strength after anchoring. Methods of producing the light burned magnesia including a seawater method and a magnesium carbonate roasting method are not limited, but preferably burning temperature is a range of 700 to 1000° C., and more preferably 750 to 900° C.

Use amount of the light burned magnesia is not limited as long as the amount prevents decrease of uniaxial compressive strength after the anchor fixing agent of the present invention is cured (consolidated). But preferable is a range of 1 part by mass to 20 parts by mass, more preferably 3 parts by mass to 10 parts by mass to total amount of 100 parts by mass alumina cement and limes/or portland cement.

And as for mix of the present anchor fixing agent, the other additives if desired may be contained within a scope of not affecting the property. For example, additives may be aggregate (form is not limited, particle, broken pieces, and fiber may be possible) including crushed stone, calcium carbonate particle, silica sand, sand, quartz, glass, chalk, kaolin, and bentonite; viscosity modifier or viscosity improver (e.g. gum substance, cellulose, carboxylmethyl cellulose, urethane bond content polyether), dispersant, surfactant (e.g. sodium dodecylbenzensulfonate (e.g. sodium salt, potassium salt)), anti-sagging agent, granulated blast furnace slug, and silica fume; water reducing agent such as polycarboxylic acid, AE agent, expansive agent such as ettringite, plaster, other extending agents, and fibers.

Viscosity of the anchor fixing agent of the present invention is not particularly limited, but the viscosity which is not too low is preferable depending on usage conditions (angle of the anchor) and approximately 0.1 to 1.0 Pa·s. is preferable and more preferable is 0.5 to 5 Pa·S.

Next, the anchor fixing agent ampule will be described. As ingredient of the above mentioned anchor fixing agent, there are solid components and liquid components. In a method of manufacturing the anchor fixing agent, for example, a solid component and a liquid component may be mixed in a cup and the like to make slurry. Further this anchor fixing agent may be injected in the borehole drilled in concrete, bedrocks and the like to fix the anchor. However, in consideration of construction, solid component and liquid component are separately sealed in ampule, easy broken container such as glass container, the ampule is directly broken by the anchor to be fixed, the anchor fixing agent of the present invention is mixed in the borehole of the anchor to make the sealed solid component and liquid component slurry, thereby producing the anchor fixing agent of the present invention.

That means the anchor fixing agent ampule of the present invention features that solid component and liquid component of the above mentioned anchor fixing agent of the present invention are separately sealed.

Containers of the anchor fixing agent ampule of the present invention (ampule itself) are not particularly limited as long as by the container can be easily broken by hitting with the anchor to be fixed, for example driving the anchor in with a hammer drill and the like, and exemplified are glass, plastic, plastic bag, etc. As for ampule material, glass is preferable as aggregate because pieces of broken ampule function as aggregate.

Sealing mode of the solid component and the liquid component in the anchor fixing agent of the present invention is not particularly limited as long as the solid component and the liquid component are separated, but preferable is a mode of double tube consisting of an outer tube which is in size of the borehole installed and an inner tube which is smoothly housed in the outer tube.

Silica fume is preferable for improving mix performance of solid and liquid components when the anchor fixing agent ampule is broken. Preferable use amount of silica fume is a range of 5 to 50 mass %, more preferably 10 to 30 mass %, to a total amount of alumina cement, limes and portland cement.

Use of surfactant is also preferable for improving mixing performance of solid and liquid components when the anchor fixing agent ampule is broken. As for such surfactant, preferable examples are dodecylbenzene sulfonate (e.g. sodium salt and potassium salt, particularly sodium salt is preferable). Preferable use amount of the surfactant is a range of 0.01 to 0.5 mass, more preferably 0.05 to 0.3 mass % to water.

Further using additives such as viscosity modifier or viscosity improver is preferable because it can control scattering of the anchor fixing agent in the ampule when the ampule is broken by inserting the anchor and control water absorption into the inner wall surface of the drilled borehole. As for such viscosity modifier or viscosity improver, particularly preferable is carboxymethyl cellulose. Preferable use amount of the viscosity modifier and the viscosity improver is a range of 0.05 to 1.5 mass, more preferably 0.1 to 0.8 mass % to water.

In the anchor fixing agent of the present invention which includes water as one of essential components as described above, solid component soluble with water can be treated as liquid component dissolved in water if desired.

Next, a method for fixing agent will be described. A method for fixing anchor of the present invention is a method for fixing an anchor to a mother material in which the anchor is fixed to the mother material using the above mentioned anchor fixing agent of the present invention or the above mentioned anchor fixing agent ampule of the present invention.

Methods are not specifically limited, but the anchor fixing agent or anchor fixing agent ampule of the present invention can be used same as the conventional known anchor fixing agent or anchor fixing agent ampule is used.

For example, a borehole suitable for insertion of the anchor is drilled in the mother materials such as natural rocks, bedrocks, artificial rocks, concrete, or and bricks, the above anchor fixing agent of the present invention is injected into this borehole or the anchor fixing agent of the present invention is injected into a clearance between the borehole and the anchor after the anchor is inserted, in the case that the anchor fixing agent itself is used, or the anchor fixing agent may be manufactured inside the borehole during the anchor is inserted after ingredients of the anchor fixing agent of the above invention is injected into the borehole.

In the case of the anchor fixing agent ampule, a borehole suitable for insertion of the anchor as well, and the ampule is broken by inserting the anchor into the bore, thereby mixing the components in the ampule.

Amount of the anchor fixing agent or anchor fixing agent ampule (amount of the anchor fixing agent in the ampule) is not particularly limited. But since extremely little amount causes low strength and extremely much amount causes strength poverty as well as affecting optimal industrialization, preferable amount may be a range of approximately 0.01 to 1 cm$^3$, more preferably approximately 0.05 to 0.5 cm$^3$ to a surface area of 1 cm$^2$ which is located in the borehole in assumption that the anchor is simple cylinder.

With regard to the borehole provided in the mother material for inserting the anchor, it may be provided in such manner that the sum of the cubic volume inside the borehole and the volume of the anchor fixing agent of the above mentioned amount is substantially equal to the cubic volume of the borehole. Even if a little of anchor fixing agent is overflowed, it does not matter as long as it is within an ordinary and industrially appropriate scope based on workability and the like. However the overflowed amount of the anchor fixing agent is not counted as the amount of the anchor fixing agent used in the present invention.

Subsequently, the anchor is retained for appropriate curing time, and then the anchor can be fixed to the mother material.

EXAMPLE

Examples of the present invention will be shown hereinafter.

Examples 1 to 6

Alumina cement (manufactured by Taiheiyo Cement Corporation), hydrated lime (manufactured by Ryoko Lime Industry Co., Ltd.), calcium carbonate particle (1 mm diameter), light burned magnesia (manufactured Ube Material Industries), expansive agent ("Hyperexpan" manufactured by Onoda Cement Co., Ltd.), water, high-performance water reducing agent (Brand name: "Mighty 21HF" manufactured by Kao Corporation), and sodium gluconic acid are mixed to form slurry according to the table shown below (numerical value representing ingredient amount is part by mass). The thus formed slurry is injected into a borehole having a diameter of 14.5 mm and depth of 100 mm which is drilled in the concrete body and an anchor having a size of M-12 is installed with hammer drill. Withdrawing tests are conducted one day and 28 days after the installation and results shown in the following table 1 are obtained.

Table 1 shows that the most excellent mix ratio of alumina cement and lime is 80/20. And it also shows that adding light burned magnesia prevents withdrawal resistance from longitudinal decrease.

Examples 7 to 12

Based on mixture of Examples 1 to 6, each of the liquid components are further added with sodium dodecylbenzensulfonate (0.1 mass % of water) as surfactant and carboxymethyl cellulose (0.5 mass % of water) as viscosity improve, and they are sealed in glass ampules to produce the anchor fixing agent of the present invention (Examples 7 to 12 respectively). This anchor fixing agent ampule has double tubes consisting of an inner tube (diameter of 7 mm, length of 90 mm, thickness of 0.4 mm) and an outer tube (diameter of 13.5 mm, length of 100 mm, thickness of 0.5 mm), and solid component and liquid component are separately contained, the solid component is sealed between the outer tube and inner tube, the liquid component is sealed inside the inner tube, and they are sealed at ratio in which entire amount of the solid component is 10 g.

This anchor fixing agent ampule is inserted in the borehole drilled into the concrete body, the anchor is bolted with a hammer drill to break the glass ampule, and the inner solid and liquid components are mixed to settle. At this time, insertability of the anchor is confirmed and withdrawal resistance one day after insertion. The type of the thus installed anchor is M-12 and the size of the borehole of the concrete body is set $\phi$14.5 mm×depth 100 mm.

The result of the tests shows that the anchor is installed without any trouble of anchor insertability and with regard to withdrawal resistance one day after, the anchor is broken.

Example 13

Alumina cement of 80 parts by mass, hydrate lime 20 parts by mass, calcium carbonate particle (1 mm diameter) 150 parts by mass, light burned magnesia 5 parts by mass, expansive agent 2.5 parts by mass are mixed to form solid component.

Water of 55.9 parts by mass, high performance water reducing agent 2.6 parts by mass, sodium gluconic acid 0.16 parts by mass, carboxymethyl cellulose 0.11 parts by mass, sodium dodecylbenzensulfonate 0.06 parts by mass are mixed to form liquid component.

TABLE 1

|  |  | Example 1 | Example 2 | Example 3 | Example 4 | Example 5 | Example 6 |
|---|---|---|---|---|---|---|---|
| solid component | almina cement | 90 | 80 | 70 | 80 | 80 | 80 |
|  | hydrated lime | 10 | 20 | 30 | 20 | 20 | 20 |
|  | calcium carbonate particle (1 mm diameter) | 200 | 200 | 200 | 200 | 200 | 200 |
|  | light burned magnesia | 0 | 0 | 0 | 5 | 5 | 10 |
|  | expansive agent | 0 | 0 | 0 | 0 | 2.5 | 2.5 |
| liquid component | water | 43 | 43 | 43 | 43 | 43 | 43 |
|  | high-performance water reducing agent | 2 | 2 | 2 | 2 | 2 | 2 |
|  | sodium gluconic acid | 0.3 | 0.3 | 0.3 | 0.3 | 0.3 | 0.3 |
| Withdrawal resistance (KN) | one day | 35 | * | 37 | * | * | * |
|  | 28 day | 29 | 43 | 25 | * | * | * |

\* anchor is broken

These solid component and liquid component are sealed into glass ampules similarly as in Embodiments 7 to 12 to form the anchor fixing agent ampule of the present invention.

With this anchor fixing agent ampule, the anchor is fixed similarly as in Embodiments 7 to 12 and tested similarly. The result showed the anchor is installed without any trouble of insertability and the anchor one day after insertion is broken.

What is claimed is:

1. An anchor fixing agent comprising alumina cement, limes and/or Portland cement, water, and light burned magnesia, wherein the light burned magnesia is obtained by burning at a temperature of 750 to 900° C., wherein the content of the light burned magnesia is from 1 to 20 parts by mass based on 100 parts by mass of the alumina cement, limes and Portland cement.

2. The anchor fixing agent according to claim 1, further comprising a setting retardant.

3. An anchor fixing agent ampule comprising the anchor fixing agent according to claim 1, wherein solid component and liquid component of the anchor fixing agent are separately sealed.

4. A method for fixing an anchor to a mother material comprising fixing an anchor to a mother material with the anchor fixing agent according to claim 1.

5. A method for fixing an anchor to a mother material comprising fixing an anchor to a mother material with the anchor fixing agent ampule according to claim 3.

6. An anchor fixing agent ampule comprising the anchor fixing agent according to claim 2, wherein solid component and liquid component of the anchor fixing agent are separately sealed.

7. A method for fixing an anchor to a mother material comprising fixing an anchor to a mother material with the anchor fixing agent according to claim 2.

8. A method for fixing an anchor to a mother material comprising fixing an anchor to a mother material with the anchor fixing agent ampule according to claim 6.

9. The anchor fixing agent according to claim 1, wherein the content of the light burned magnesia is from 3 to 10 parts by mass based on 100 parts by mass of the alumina cement, limes and Portland cement.

* * * * *